United States Patent [19]

Muehlenbernd et al.

[11] Patent Number: 5,189,113
[45] Date of Patent: Feb. 23, 1993

[54] PREPARATION OF HOMOGENEOUS IONICALLY CROSSLINKED ETHYLENE COPOLYMER IN TWIN SCREW EXTRUDER

[75] Inventors: Thomas Muehlenbernd, Heidelberg; Norbert Hasenbein, Dirmstein; Gernot Koehler, Worms; Lothar Schlemmer, Maxdorf, all of Fed. Rep. of Germany

[73] Assignee: BASF Aktiengesellschaft, Ludwigshafen, Fed. Rep. of Germany

[21] Appl. No.: 366,494

[22] Filed: Jun. 14, 1989

[30] Foreign Application Priority Data

Jun. 30, 1988 [DE] Fed. Rep. of Germany ....... 3822068

[51] Int. Cl.$^5$ .......................... C08F 8/44; C08F 222/02
[52] U.S. Cl. ............................. 525/329.5; 525/327.8; 525/329.6; 525/330.2; 525/330.6; 525/329.4; 525/367; 525/369; 525/370; 525/371; 525/919
[58] Field of Search ................... 525/329.5, 330.2, 367, 525/369, 327.8, 330.6, 329.4, 370, 371, 329.6; 528/481, 488, 489, 490; 526/318.6

[56] References Cited

U.S. PATENT DOCUMENTS

| | | | |
|---|---|---|---|
| 3,006,029 | 10/1961 | Luther | 425/113 X |
| 3,264,272 | 8/1966 | Rees | 526/318.6 X |
| 3,404,134 | 10/1968 | Rees | 525/329.5 X |
| 3,969,434 | 7/1976 | Powell et al. | 260/897 B |
| 3,989,434 | 11/1976 | Mercer | 425/207 |
| 4,690,981 | 9/1987 | Statz | 525/330.2 X |

FOREIGN PATENT DOCUMENTS

| | | | |
|---|---|---|---|
| 0193110 | 9/1986 | European Pat. Off. | 525/329.5 |
| 1476033 | 4/1967 | France . | |
| 1252204 | 11/1986 | Japan | 525/330.2 |
| 1066893 | 4/1967 | United Kingdom . | |
| 1475336 | 6/1977 | United Kingdom | 525/329.5 |

Primary Examiner—Fred Teskin
Attorney, Agent, or Firm—Keil & Weinkauf

[57] ABSTRACT

Ionically crosslinked ethylene copolymers are prepared by reacting the corresponding ethylene copolymer in a mixing zone of a twin-screw extruder with a solid metal compound and subsequently pumping in water, and are used as adhesion promoters, laminating films, injection molded articles or cable sheathing.

2 Claims, No Drawings

PREPARATION OF HOMOGENEOUS IONICALLY CROSSLINKED ETHYLENE COPOLYMER IN TWIN SCREW EXTRUDER

The present invention relates to a process for the preparation of ionically crosslinked ethylene copolymers by mixing an ethylene copolymer which contains, as copolymerized units, from 0.1 to 20 mol % of $\alpha,\beta$-ethylenically unsaturated carboxylic acids or $\alpha,\beta$-ethylenically unsaturated comonomers donating carboxyl groups with a water-soluble metal salt or metal hydroxide at above the melting point of the ethylene copolymer in a twin-screw extruder.

Processes of this type give thermoplastic ethylene copolymers with carboxyl-containing monomers, some of the carboxyl groups being present in free form while the remainder are bonded to metal cations, so that a certain degree of crosslinking is achieved.

Processes for modifying carboxyl-containing ethylene copolymers are described in, for example, U.S. Pat. Nos. 3,264,272 and 3,969,434 and British Patent 1,475,336. The preparation is carried out in rubber mills, two-roll mills and plastifying extruders having a length-/diameter ratio of 21 or in a single-screw extruder as described in, for example, U.S. Pat. No. 3,006,029.

However, the processes have the disadvantage that the homogeneity of the ionically crosslinked ethylene copolymers obtained is unsatisfactory.

An elegant process for the preparation of ionically crosslinked ethylene copolymers, having improved product homogeneity, in a twin-screw extruder is described in EP-A-01 93 110. However, special corrosion resistant steels, for example those having the material codes 14122, 12460, 14540 or 14405, are required. These expensive special steels reduce the cost-efficiency of the process and restrict its flexibility. A conventional, economical CPR steel from Dörrenberg Edelstahl, Engelskirchen (1.2 C/12 Cr/2.5 W/1.417 g/1.7 V) leads to pronounced corrosion in using aqueous metal salt solutions according to EP-A-01 93 110.

No corrosion at all is observed if the ethylene copolymers are mixed with solid metal salts. However, conversion of the ethylene copolymers into the ionomers is incomplete. Films exhibit specks of unconverted metal salts.

It is an object of the present invention to provide a process in which an ionomer having improved product homogeneity is obtained with minimum corrosion protection of the reaction extruder. It is a further object of the present invention to provide an ionically crosslinked ethylene copolymer which gives products having good film quality and little odor annoyance.

We have found that these objects are achieved by a process for the preparation of ionically crosslinked ethylene copolymers by mixing an ethylene copolymer which contains, as copolymerized units, from 0.1 to 20 mol % of $\alpha,\beta$-ethylenically unsaturated carboxylic acids or $\alpha,\beta$-ethylenically unsaturated comonomers donating carboxyl groups with a water-soluble metal salt or metal hydroxide at above the melting point of the ethylene copolymer in a twin-screw extruder, wherein the ethylene copolymer is mixed with the solid metal compound in the mixing zone of the extruder and is then converted into the ionomer in the melting zone of the extruder by pumping in water.

The temperature in the mixing zone is preferably from 140° to 200° C.

We have found that these objects are furthermore achieved by ionically crosslinked ethylene copolymers obtained by one of the abovementioned processes.

Suitable ethylene copolymers are copolymers of ethylene which contain, as copolymerized units, 0.1–20, preferably 0.5–10, mol %, based on the copolymer, of $\alpha,\beta$-ethylenically unsaturated carboxylic acids or $\alpha,\beta$-ethylenically unsaturated comonomers donating carboxyl groups. For the purposes of the present invention, $\alpha,\beta$-unsaturated carboxylic acids are the conventional carboxylic acids which are copolymerizable with ethylene, such as acrylic acid, methacrylic acid, itaconic acid, maleic acid or fumaric acid. $\alpha,\beta$-Ethylenically unsaturated comonomers donating carboxyl groups are, for example, methyl hydrogen maleate, maleic anhydride, tert-butyl acrylate, etc., i.e., comonomers which are converted into carboxyl-containing comonomers during or after the polymerization by hydrolysis and/or pyrolysis. The ethylene copolymers can contain, in addition to the $\alpha,\beta$-ethylenically unsaturated carboxylic acids or comonomers donating carboxyl groups, other comonomers which are copolymerizable with ethylene, as copolymerized units (cf. EP-A 1 106 999). Esters of (meth)acrylic acid, mono- and diesters of maleic acid and fumaric acid and amides of monoethylenically unsaturated carboxylic acids, in particular (meth)acrylamide and N-mono- and N,N-dialkylamides of (meth)acrylic acid, are particularly suitable. The ethylene copolymers are known per se and are described in, for example, GB-A-2 091 745, U.S. Pat. Nos. 3 520 861, 3 264 272, GB-A-1 011 981, U.S. Pat. No. 3 404 134 or U.S. Pat. No. 3 969 434. The corresponding graft copolymers are also suitable as ethylene copolymers.

The melt flow indices of the ethylene copolymers are in general 0.1–500 g/10', measured at 190° C. and 2.16 kp (according to DIN 53,735). Preferred products are those having a melt flow index of 2–80 g/10'. The melting points of the ethylene copolymers are from 70° to 115° C.

For the purposes of the present invention, water-soluble metal salts are compounds as defined in, for example, U.S. Pat. No. 3 264 272. Preferred compounds are those which contain an alkali metal salt or alkaline earth metal salt or a salt of a sub-group metal as the metal salt and are based on an organic acid, sodium acetate, calcium acetate, magnesium acetate, zinc formate and zinc acetate being particularly preferred. Preferably used metal hydroxides are alkali metal hydroxides or alkaline earth metal hydroxides.

In general, not less than 10% by weight of the acid groups in the ethylene copolymer are neutralized. The degree of neutralization can be determined by IR analyses, by titration or by metal analysis.

According to the invention, the ethylene copolymer is metered into the feed orifice of a twin-screw extruder, for example ZSK 57 from Werner & Pfleiderer, and is melted in a melting zone at 140°–200° C., preferably 140°–160° C., and finely dispersed with the solid metal salt in a mixing zone by means of kneading element. The metal salt can be added through the polymer feed hopper or through a second solids feed hopper.

An amount of water just sufficient to obtain a homogeneous ionomer is then pumped into the polyner melt in the melting zone, preferably in a partially filled zone of the extruder. The amount of water preferably corresponds to the amount required for a 10–20% strength solution of the metal salt. It is particularly advantageous to employ a procedure using somewhat more concentrated solutions, since the water removal step is thus simplified.

An advantage of this procedure is that an additional process step, the dissolution of the metal salt in water, as required according to EP-A-0 193 110, is dispensed with. Furthermore, in EP-A-0 193 110, it is generally necessary, owing to the solubility limit of the metal salts, to remove relatively large amounts of water from the finished ionomer by evaporation in order to achieve industrially relevant degrees of neutralization of more than 10 mol %; this is energetically dsadvantageous. Such a disadvantage is not encountered in the process described here. Furthermore, surprisingly, no corrosion at all was observed when the extruder screw consisted of conventional CPR steel. However, pronounced corrosion occurred when an aqueous metal salt solution according to EP-A-0 193 110 was used for neutralization.

EXAMPLE 1

50 kg/hour of an ethylene/acrylic acid copolymer (EAA copolymer; acrylic acid content: 8.1% by weight) were introduced into a type ZSK 57 twin-screw from Werner & Pfleiderer, which was equipped with corrosion-resistant screw elements only at the liquid feed point. 1.05 kg/hour of sodium hydroxide in the form of flakes were metered into the polymer in the feed zone via a solids metering point shielded from atmospheric humidity and blanketed with nitrogen. This mixture was melted at 140° C. and homogenized. At the end of the melting zone of the extruder, 6 kg/hour of distilled water were fed into the melt and the mixture was reacted in the downstream zone at 220° C. The water was removed from the mixture by stepwise, three-fold devolatilization after the end of the reaction, the product was extruded and the extrudates were granulated.

The sharp decrease in the melt flow index (starting copolymer: 13.8 g/10 min; reaction product: eg. 0.6 g/10 min) clearly indicated that the reaction was complete. The sodium content was determined as 1.1% by weight, indicating a degree of neutralization of 44 mol %.

The product had a good film quality and was free of specks. The absence of corrosion during the preparation in the extruder is clearly demonstrated by a completely colorless product and the low iron content (less than 10 ppm).

COMPARATIVE EXAMPLE 1

In the manner described in Example 1, 50 kg/hour of an EAA copolymer (acrylic acid content 8.1% by weight) were reacted with 5.3 kg/hour of 20% strength by weight sodium hydroxide solution in the ZSK 57. As above, the water was removed by three-stage devolatilization. The extruded and granulated product had a deep brown color, and the high iron content (1,150 ppm) indicated pronounced corrosion in the extruder during the reaction.

COMPARATIVE EXAMPLE 2

In the manner described in Example 1, 50 kg of the EAA copolymer (acrylic acid content 8.1% by weight) were reacted with 3 kg of solid sodium acetate in the ZSK 57. The product contained 0.9% by weight of sodium but the fact that the melt flow index did not decrease very greatly (to 9.1 g/10 min) indicated that crosslinking was not very complete. Moreover, all films had only a low tensile strength and a very high content of specks.

We claim:

1. A process for the preparation of a homogeneous ionically crosslinked ethylene copolymer, the said process comprising the steps of:
   (1) introducing into the feed zone of a twin-screw extruder comprising a feed zone, a mixing zone, a melting zone and a downstream zone, an ethylene copolymer containing, as copolymerized units, from 0.1 to 20 mol-% of at least one α-β-ethylenically unsaturated carboxylic acid or at least one α-β-ethylenically unsaturated comonomer donating carboxyl groups, and a water-soluble metal salt or metal hydroxide, the said water-soluble metal salt or metal hydroxide being added in the solid state either through the polymer feed hopper or through a second solids feed hopper;
   (2) mixing and finely dispersing the said water-soluble metal salt or metal hydroxide with the ethylene copolymer in said mixing zone at a temperature in the range of from 140° to 200° C. to obtain a dispersion;
   (3) melting and homogenizing the dispersion in said melting zone to obtain a polymer melt;
   (4) pumping water into said polymer melt in said melting zone to obtain a mixture and;
   (5) reacting the mixture in the downstream zone to obtain the homogeneous ionically crosslinked copolymer.

2. The process of claim 1, wherein the water-soluble metal salt or metal hydroxide is an alkali metal hydroxide or an alkaline earth metal hydroxide.

* * * * *